United States Patent [19]

Morin

[11] 4,067,118
[45] Jan. 10, 1978

[54] FLUIDIZED BED REACTOR

[75] Inventor: Claude Morin, St. Lattier, France

[73] Assignee: CERCA, Compagnie pour l'Etude et la Realisation de Combustibles Atomiques, Paris, France

[21] Appl. No.: 661,354

[22] Filed: Feb. 25, 1976

[30] Foreign Application Priority Data

Apr. 15, 1975 France .................................. 75.12267

[51] Int. Cl.² .................... F26B 3/08; F26B 17/00
[52] U.S. Cl. ...................................... 34/10; 34/57 A; 432/58
[58] Field of Search .................. 34/10, 57 A, 57 R; 432/58

[56] References Cited

U.S. PATENT DOCUMENTS

| 2,378,342 | 6/1945 | Voorhees et al. | 34/10 |
| 2,964,299 | 12/1960 | Bowers et al. | 34/10 |
| 3,012,848 | 12/1961 | Levey, Jr. et al. | 34/10 |
| 3,070,970 | 1/1963 | Zagar et al. | 34/10 |
| 3,514,868 | 6/1970 | Hoggarth | 34/57 A |
| 3,527,575 | 9/1970 | Thompson | 34/10 |
| 3,578,798 | 5/1971 | Lapple et al. | 432/58 |
| 3,615,668 | 10/1971 | Smith, Jr. | 34/10 |
| 3,730,731 | 5/1973 | Smith, Jr. | 34/10 |

Primary Examiner—John J. Camby
Attorney, Agent, or Firm—Dennison, Dennison, Meserole & Pollack

[57] ABSTRACT

The invention relates to a new type of fluidized bed reactor of the so-called central jet type.

This reactor has an annular shape such as that shown in the accompanying drawings. The annulus is defined by vertical cylindrical walls at its upper part, and by conical walls at its lower part, the latter walls being joined to one or more annular pipes. Such an arrangement considerably increases the capacity of the jet reactors.

This reactor may be used for a large number of applications: preparation of nuclear fuels, drying of cereals, etc.

12 Claims, 6 Drawing Figures

FLUIDIZED BED REACTOR

The invention relates to a new type of fluidized bed reactor which enables the advantages of the two main known types, namely homogeneous fluidized bed reactors and central jet fluidized bed reactors, to be combined.

As is known, homogeneous bed reactors can be expanded to give large capacity units, which is not the case with central jet reactors. On the other hand, central jet reactors are the only reactors which enable a very high degree of reproducibility of the operating conditions to be achieved as regards the elementary particles constituting the bed due to a frequent and well controlled renewal of the particles in all the reactor zones.

The new type of reactor according to the invention may be in the form of large capacity units in which the operating conditions may be strictly controlled and reproduced for each elementary particle.

This new type of reactor which may be employed for all kinds of reactions involving transfer of heat and/or matter between a fluid medium and solid particles, is particularly suitable when the particles constituting the bed have to be subjected to one or more physical, chemical or physico-chemical treatments intended to modify the characteristics of the bed in as reproducible a manner as possible from one particle to the next, and on an industrial production scale. This is particularly the case is preparing particles of nuclear fuel consisting of a core of uranium or thorium oxide or carbide coated with one or more concentric layers of pyrolytic carbon and possibly silicon carbide. Such particles, which generally have diameters less than 1 mm, should be produced in amounts rapidly rising to several dozens of tons per year and then several hundreds of tons per year once the construction and operation of nuclear reactors of the HTR type get under way. As has just been shown, a homogeneous fluidized bed reactor is not suitable for such applications.

In fact, a reactor of this type such as shown in FIG. 1 comprises a casing 1, generally cylindrical, made of a heat-resistant material and heated by known means (not shown). Inside the casing there is a plate 2 with a large number of small holes, or, consisting of a porous material. A fluid is injected into the chamber 3 located below the plate and passes upwardly therethrough. The pressure and flow rate of the fluid are regulated so that the bed of particles 4 is fluidized. This fluid may be a liquid or mixture of liquids, a gas or mixture of gases, or even a mixture of one or more gases with one or more liquids. The particles of the bed may play a purely physical role, for example a heat transfer agent, a physico-chemical role, or a chemical role with respect to the fluid. In the latter case, dissociation reactions of one or more components of the fluid can be considered, for example, to be produced on contact between the particles and the fluid, with the formation of deposits on the particles of the bed. However, it is found that the aerodynamic behavior of such a reactor is not absolutely stable since it is impossible to ensure a perfectly homogeneous distribution of the gas stream through the whole mass of particles.

The particles are subjected to incalculable, random movements and elutriation or grading phenomena of the particles in the bed are observed, especially when all the particles do not have the same diameter. When the diameter of such reactors is increased, heterogeneous fluidization phenomena and leakage and boiling phenomena are also observed. These well known phenomena have been described, for example, by P. Reboux in "Fluidization Phenomena" (Association Francaise de Fluidization, Paris 1954).

For all these reasons, it is impossible to create reproducible physico-chemical conditions as regards the particles constituting the bed in such a reactor. The result is that in this type of reactor, particles cannot be coated under good conditions with layers obtained by thermal dissociation of a suitably chosen fluid. In fact, in order to achieve this result, the gas or liquid to be dissociated must be mixed in the desired proportion with the fluidization gas or liquid so as to encounter each particle constituting the fluidized bed under conditions which are on average identical as regards velocity, concentration, temperature and contact time. It is easy to realize that when the fluidized bed is the site of heterogeneous phenomena, such as have just been described, there is no chance of obtaining coatings having characteristics more or less reproducible for each particle. The difficulty is further increased by the fact that the particles being coated, such as those consisting of uranium oxide, never have a strictly constant diameter.

It is found, for example, that in a batch of $UO_2$ particles prepared, and which are supposed to have an average diameter of about 500 microns, the diameter of the particles may vary between about 450 and about 550 microns, resulting in a ratio of almost two between the masses of particles of extreme diameters.

These differences in initial diameter will also aggravate the grading phenomena which occur within the fluidized bed and will make it impossible to obtain, reproducibly, coating layers of pyrolytic carbon or silicon carbide.

Since the reproducibility of these layers for each particle, especially as regards thickness, density, impermeability, is absolutely necessary in the case of the nuclear applications mentioned above, users have turned their attention to a second type of fluidized bed reactor, namely the central jet reactor. This type of reactor is shown diagrammatically in FIG. 2 and comprises a cylindrical casing 5 of a heat-resistant material heated by a means (not shown), which is extended downwardly by a conical part 6 which is connected to one or more fluid feed pipes. The conical wall makes an angle of the order of 45° to 75° with respect to the horizontal. In the case of FIG. 2, two concentric pipes 7 and 8 have been shown: the central pipe 7 enables a deposition fluid to be introduced, and the annular pipe 8 enables a fluid intended to pre-fluidize the particle bed 9 to be introduced.

This fluidization current only partially broadens out and forms two different zones in the fluidized bed, namely the zone adjacent to the axis in which the concentration of particles in the fluid is low and the general movement of the particles is upwards, and the annular or peripheral zone in which the concentration of the particles is high and the general movement is downwards. The zone adjacent to the axis is continuously supplied with particles in the vicinity of the base of the conical part by the particles coming from the peripheral zone which are thus systematically transported to the upper part of the bed by means of the central jet. An orderly, perfectly reproducible movement of the particles constituting the fluidized bed is thereby obtained, in which each particle follows in a cyclical manner, a path from top to bottom in the vicinity of the reactor walls and is then directed because of the conical shape of the base of the reactor, towards the axis thereof where it is driven upwardly by an axially symmetrical jet whose initial diameter is small compared with the diameter of the cylindrical part of the reactor.

The aerodynamical behavior of such a reactor has been described and calculated in particular by Mathur (An analysis of air and solid flow in a spouted wheat bed, Canadian Journal of Chemical Engineering, October 1959, pages 184–192). It has been found that it is entirely suitable for the coating of particles by dissociation of compounds injected into the axial pipe or pipes. This suitability is basically due to the fact that each particle of the batch effects a large number of elementary cycles during the time of the coating operation, and furthermore, the time of the average cycle can be calculated with some degree of accuracy and all the particles perform the same number of cycles to a good approximation.

For each particle, the time variations compared with the mean cycle are distributed according to a Gaussian distribution of low variance. It is thus simple to calculate the deviations and forecast the number of cycles necessary to maintain them within the desired limits.

It has been found in practice and has been confirmed by calculation that it was not possible to increase the dimensions of reactors of this type beyond certain limits. This is due to several reasons which are relatively easy to understand. First of all, in such a reactor, the fluidized bed has a low density in the vicinity of the axis due to the large amount of gas injected, and a high density at the periphery where the degree of fluidization is very low. The consequence of this is a low thermal conductivity of the batch and thus a marked drop in temperature from the walls heated from the exterior to the axis where the compound or compounds injected disocciate on contact with the particles, said dissociation most often occurring endothermically or exothermically.

If the walls of the reactor are heated too strongly, there will be an increasing risk that part of the injected gases will dissociate on contact with these walls and produce deposits which will have a deleterious effect on the operation of the reactor.

Furthermore, in such a reactor, the feed cross-section of the central jet by the particles flowing down the walls is substantially proportional to its diameter, whereas the discharge of this jet is proportional to the square of the diameter, all other things being equal. There is thus a decrease of the jet increases, and the yield rapidly falls (which not only produces a prolongation of the deposition times, but also produces a large amount of soot which is difficult to remove.)

It can thus be seen that this factor limits the possible increase in the diameter of the reactor since, as the dimensions increase, the mass flow of particles borne by the jet will increase less quickly than the charge. The result is an increase in the time necessary to obtain a given deposition thickness. There is thus a dimensional limit beyond which any increase in the dimensions of the reactor will not produce any further increase in the reproduction thereof. This dimensional limit varies somewhat depending on the characteristics of the particles being coated and the specified operating conditions.

As an example, a reactor of this type commonly used for coating particles of $UO_2$ will have the following characteristics: diameter of the cylindrical part — 125 mm; weight of the uranium oxide batch, about 3 kg of particles which are substantially spherical and have a diameter of 450 to 550 microns.

It will be possible in such a reactor operating at temperatures of between 1300° and 1800° C in the interior to deposit a coat of porous pyrocarbon 80 microns thick in about 7 minutes using acetylene or a coat of dense pyrocarbon 80 microns thick in about 32 minutes using propylene. An initial heating time of about 1 hour and a cooling time of 2 hours must be added to these times.

Calculations show that if the diameter is doubled, i.e. increased to 250 mm, the charge or batch would be raised to about 16 kg, but the deposition times would be multiplied 9 times and the temperature rise time and cooling time would be appreciably increased. It can thus be seen that the average hourly production of such a reactor would be about 2.6 kg of $UO_2$ instead of 4.5 kg of $UO_2$ for a reactor 125 mm in diameter, these values being calculated not taking into account the heating and cooling times. Moreover, a diameter of 250 mm also appears to be a limit at the present time as regards regulating the temperature of the central zone from walls which are heated from the outside.

Several solutions have been invented in order to try and increase the productivity of central jet reactors.

In French Pat. No. 2,105,977 it has been proposed to replace the single central jet by several jets inclined with respect to the axis so as to cause the particles to rotate around the axis. In fact, such an arrangement does not increase the flow rate much compared with that of a single jet reactor. Again, if it is desired that the circulation of the particles remains ordered and thus calculable and reproducible, it is always necessary to produce a general circulation of the particles upwards in the vicinity of the axis, and downwards near the walls. If there is a plurality of jets there is a risk of slowing down this circulation and above all of seriously disturbing it, with a consequent enlarged dispersion of deposition thicknesses on the particles. Furthermore, if there is more than one jet it becomes difficult to maintain the flow rates equal, and as a result there is a risk of dissymmetry occurring in the system and also a risk of particles falling into some of the pipes and blocking them. Finally, such a reactor does not resolve the problems of thermal transfer, and more especially the problems of temperature control in the central zone.

In order to solve these problems more satisfactorily, it has been proposed in U.S. Pat. No. 3,451,784 to make the upper part of the reactor substantially parallelepiped in shape instead of cylindrical, while the lower part will have the shape of an inverted triangular prism instead of being conical. Such an arrangement may enable the problems of thermal transfer to be solved to some extent since the distance between two opposite vertical walls of the reactor can be limited to a value determined by practical experience, while the desired capacity is obtained by increasing the distance between the two other opposite vertical walls as far as is necessary.

However, in such a reactor the basic difficulty in using it to coat particles is to be able to reproduce the cycle of the elementary particles such as is created in a reactor of the type shown in FIG. 2. This result cannot be achieved in the case of the U.S. Pat. No. 3,451,784 since the arrangement adopted is not that of a central jet, but instead comprises an assembly of horizontal injection nozzles at several levels along the prismatic base of the reactor. Such nozzles do not provide an ordered and calculable circulation of particles.

Finally, it has been proposed in U.K. patent specification No. 1,251,853 that while the reactor has a general shape comparable to that which has just been described, the injection of the fluidization and deposition gases is carried out in a substantially horizontal channel by means of a series of independent, adjacent jets, means being provided to produce a general displacement of the particles of the fluidized bed from one end of the channel to the other. In this type of reactor the particles to be coated are introduced at one end of the channel and removed at the other end. Although several means for ensuring the displacement of the particles from one end to the other are mentioned, these means do not provide the truly reproducible coating conditions for each particle which are sought in the case of nuclear fuels. It is known in fact that in a fluidized bed the particles behave like a real liquid and are capable of moving rapidly from one end of the bed to the other. Thus, one cannot see how it would be possible, using an arrangement such as described in this patent, to obtain the relatively long, and reproducible, particle uniformly with pyrolytic layers of very high quality.

Moreover, and quite generally, it appears extremely difficult in reactors devoid of axial symmetry to produce deposition conditions which are reproducible for each particle. In such reactors there is a very great risk that a state of non-equilibrium will exist or be created as regards the injection conditions of the gases from one end to the other, and it is difficult to avoid the existence of end zones in which the circulation conditions of the particles and the heat transfer conditions are disturbed.

The new type of reactor which is the subject of the invention enables all these disadvantages to be completely obviated and the axial symmetry to be preserved, while no longer having the limitations of cylindrical reactors. The reactor according to the invention is an annular, fluidized bed jet reactor.

Figure 1:
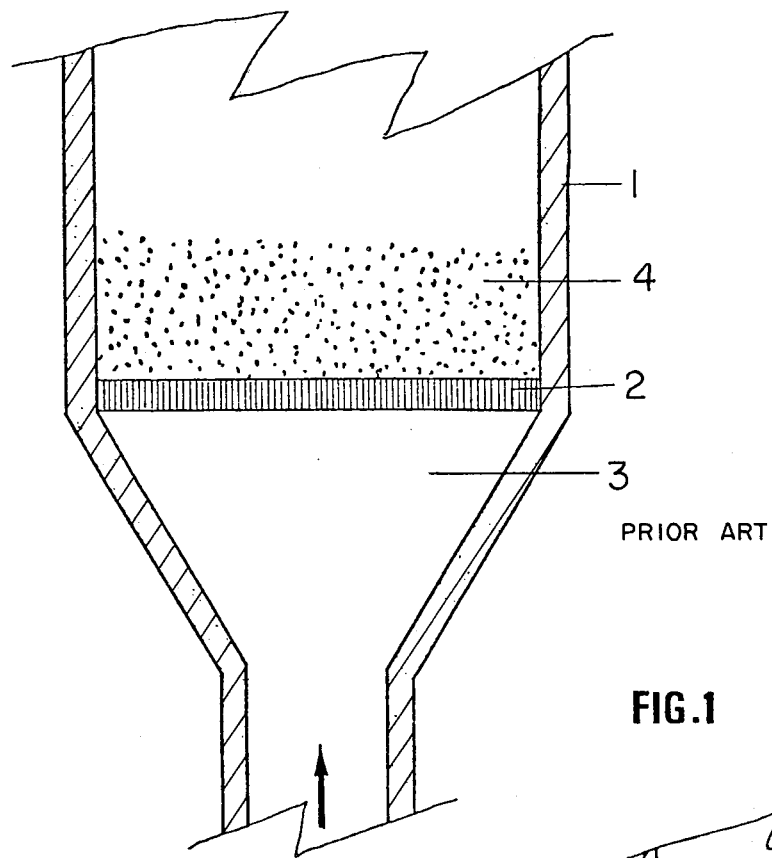
FIG. 1 is a diagrammatic view, in vertical section, of a prior art fluidized bed reactor.
Figure 2:
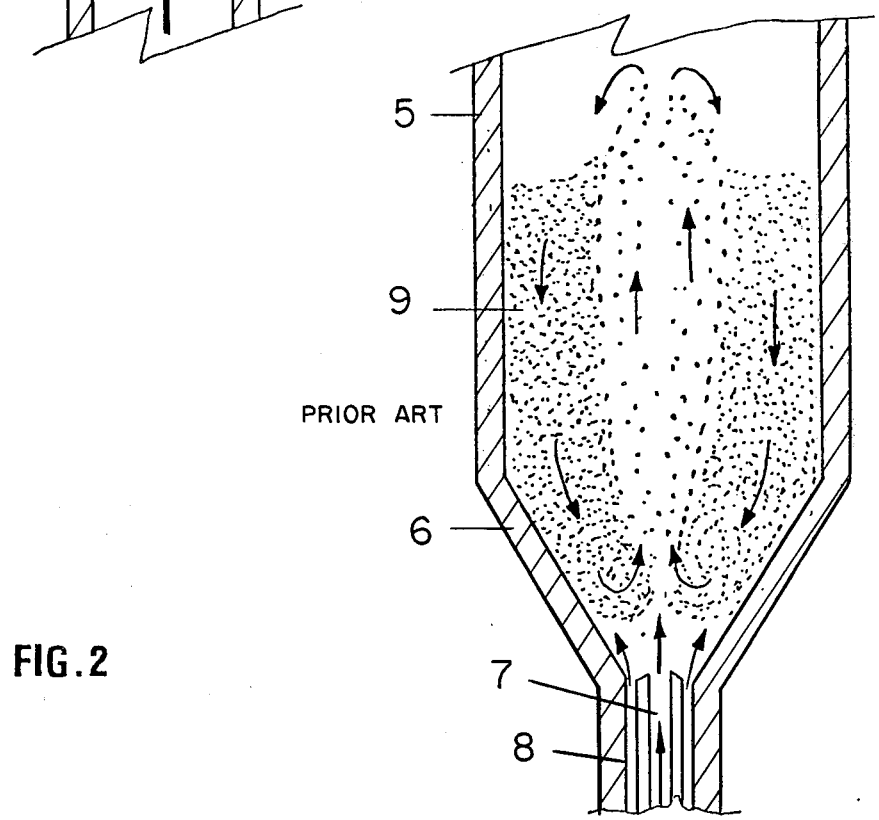
FIG. 2 is a diagrammatic view, in vertical section, of another embodiment of a prior art fluidized bed reactor.
Figure 3:
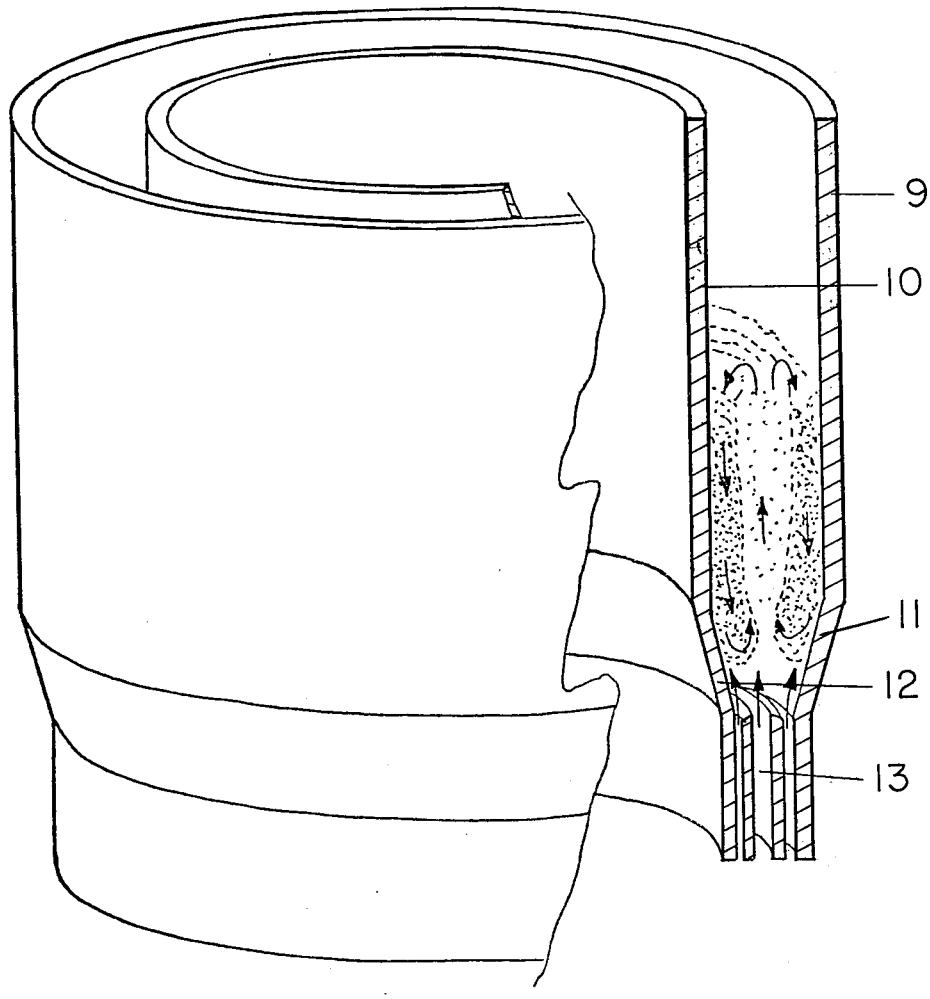
FIG. 3 is a diagrammatic perspective view, with a portion broken away to show in vertical section interior details of a fluidized bed reactor constructed in accordance with the present invention.
Figure 4:
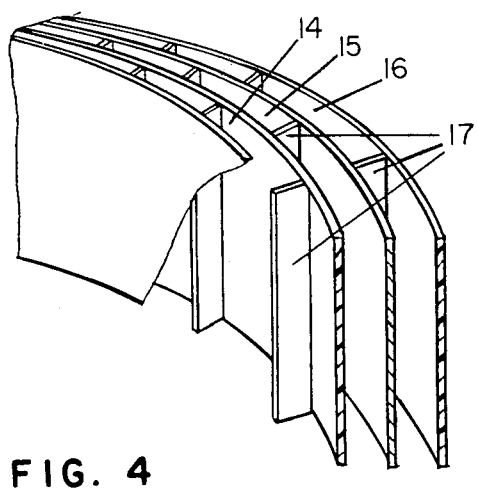
FIG. 4 is an enlarged fragmentary diagrammatic perspective view, with a portion broken away, of another embodiment of an annular nozzle of the annular reactor of FIG. 3.
Figure 5:
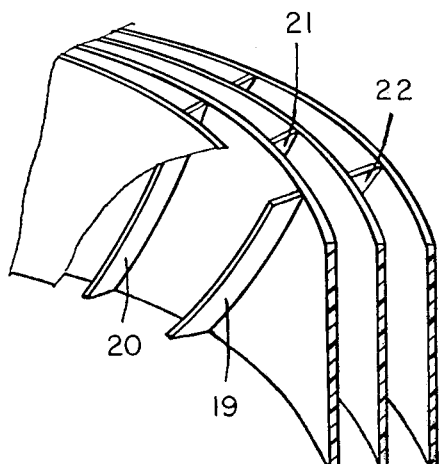
FIG. 5 is a view similar to that of FIG. 4 showing a modification of the nozzle structure of FIG. 4.

It can be seen that the annulus is defined by vertical cylindrical walls 9 and 10 at its upper part, and by conical walls 11 and 12 at its lower part. These conical walls are joined at their lowest point to one or more pipes or nozzles 13 of annular shape. As seen in FIG. 4 another embodiment of the nozzle consists of three concentric annular orifices defined by outer and inner pipes 16 and 16' and inner pipes 14 and 15, respectively. These pipes may consist of continuous slits or rows of cylindrical small holes arranged vertically or slightly inclined with respect to the vertical, or even of long slits separated by thin partitions. As seen in FIG. 4 these substantially radial partitions 17 may be vertical or slightly inclined with respect to the vertical as shown in FIG. 5 at 19, 20, 21 and 22 so as to impart a tangential horizontal component to the motion of the fluidized particles and cause them to revolve around the annulus, thereby preventing any dissymmetry in the reaction conditions. This arrangement is however not absolutely necessary, for tests carried out on a reactor model with transparent walls have shown that if a small amount of particles having a color different from that of the majority of the particles is introduced at a point in such a type of reactor, operation of the fluidization system for only a few tens of seconds is sufficient to obtain a perfectly random distribution of the "marked" particles at all points of the annulus, even when the batch of particles having a diameter less than 1 mm reaches or exceeds values such as 70 or 100 kg.

In such a reactor calculations show, and tests confirm, that the average cycle velocity of the particles is principally a function of the annular gap between the two concentric walls, and of the flow rate of the fluidization liquid or liquids. The mean diameter of the annulus has less evident influence.

If a central jet cylindrical reactor is compared with an annular fluidized bed jet reactor according to the invention, in which the annular gap is equal to the diameter of the cylindrical reactor, calculations and tests show that the cycle velocity of the particles of the annular reactor is always greater than that of the cylindrical reactor.

The result is that the increase in production of this annular reactor compared with this cylindrical reference reactor is greater than the ratio of the cross sections of the pathways of the gases through the fluidized beds. This is largely explained by the fact that, on the one hand, for the same volume of fluidized particles it is simple to have a much larger gas injection cross-section with an annular injector than with a cylindrical injector, and on the other hand an annular injector offers a larger feed cross-section of particles to the jet for the same gas pathway cross-section.

The following example relating to deposition of pyrocarbon on UO$_2$ particles enables a comparison to be made between the performances of two annular reactors according to the invention and a cylindrical, central jet reactor. The annular reactor 1 has a capacity of 25 kg of particles, comparable to that of a cylindrical reactor 250 mm in diameter, which is a limit while the annular reactor 2 has an inter-wall distance equal to the diameter of the cylindrical reactor which is employed here as a reference, i.e. 125 mm.

TABLE 1

|  | CYLINDRICAL, CENTRAL JET REACTOR | ANNULAR REACTORS 1 | 2 |
| --- | --- | --- | --- |
| Diameter of the cylindrical part in the interior | 125 mm | — | — |
| Distance between the two cylindrical walls | — | 50 mm | 125 mm |

TABLE 1-continued

| | CYLINDRICAL, CENTRAL JET REACTOR | ANNULAR REACTORS | |
|---|---|---|---|
| | | 1 | 2 |
| Mean diameter of the annulus | — | 280 mm | 870 mm |
| Weight of a batch of UO$_2$ particles having an average diameter of 500 μm | 3 kg | 25 kg | 175 kg |
| Temperature of the bed of particles | 1300/1800° C | 1300/1800° C | 1300/1800 |
| Time to deposit 80 um of pyrocarbon using acetylene | 7.2 mins. | 4.4 mins. | 17.4 mins. |
| Time to deposit 80 um of dense pyrocarbon from propylene | 32 mins. | 19.3 mins. | 76.4 mins. |
| Heating and cooling time | 120 mins. | 150 mins. | 180 mins. |
| Total time of an operation | 159 mins. | 173 mins. | 274 mins. |
| Weight of coated particles obtained | 4.62 kg | 38.5 kg | 270 kg |
| Mean hourly production expressed in weight of UO$_2$ (extending heating and cooling) | 4.5 kg UO$_2$/hr | 63 kg UO$_2$/hr | 112 kg UO$_2$/hr |

Table 1 shows that the hourly production of the annular reactor is 14 to 25 times that of the cylindrical reactor. Just as the diameter of the cylindrical central jet reactors may be roughly doubled and raised to 250 mm, annular reactors may also be considered in which the distance between the two cylindrical walls will reach this value. However, although such a reactor has not been made calculations predict that the reduction in the deposition yield will make it undesirable to enlarge that distance while maintaining a constant mean diameter.

On the other hand there is theoretically no limit to the flow rate of an annular reactor since it is sufficient to increase the mean diamter of the annulus in order to raise the production without modifying the distance between the cylindrical walls if it is desired to maintain the cycle velocity of the particles constant. In fact, numerous tests already carried out enable the deposition yields in a reactor of given dimensions to be predicted to a good degree of approximation. It is thus simple, in a given economic context and for known technical construction limits, to optimize the dimensions of a reactor and this may possibly lead to the adoption of an interwall distance greater than 125 mm. In particular, it is possible to consider that a large reactor is more suitable than a smaller one whose yield is better, since in this case the non productive heating and cooling times are distributed over a larger batch and the relative cost of the controls and checks which are carried out also decreases. It is worth noting that in the case of nuclear fuels the cost of the checks carried out on each batch is extremely high but is almost independent of the unit weight of these batches.

At the present time, in the case of uranium oxide particles coated with pyrocarbon the cylindrical reactors are made of graphite by using billets in which the cylindrical crucible part is obtained in one piece by machining and terminates at its base in a conical part into which the injector or injectors open out. Heating is carried out by induction or by irradiation with graphite resistance units.

This technology may easily be adapted to the construction of annular reactors. In fact, at the present time there already exist graphite billets more than 1 meter in diameter and in order to go beyond this it is perfectly possible to construct reactors by assembling graphite elements by techniques known to those skilled in the art. In the case of very large dimensions, a crucible unit may also be made from sheets of a refractory metal which is then coated with graphite by spraying (Schoop process).

The heating of the exterior and interior cylindrical walls does not present any special problems. It is sufficient to suitably control the heating by any means known to a person skilled in the art in order to obtain the same temperatures for the wall.

It is also clear that any reactor according to the invention may be provided in its upper part with an extension or enlargement sufficient so that the corresponding deceleration of the fluid reduces the risk of entraining the smallest particles, according to a well known technique.

The example we have just given illustrates the very great value of an annular reactor according to the invention in the case of the production of particles of nuclear fuel (based on uranium oxide for example) which are intended to be coated with pyrocarbon and/or silicon carbide. The example is in no way limiting. Very many types of coating or treatment of particles of all sorts may be effected in such a reactor.

Another particularly interesting example of the use of reactors according to the invention is the conversion of uranium hexafluoride (UF$_6$) into uranium oxide (UO$_2$) of ceramic quality. It is known that such a conversion is currently carried out in two or more successive fluidized reactors, and the following reactions occur to some extent in succession and to some extent simultaneously:

$$UF_6 + 2H_2O \rightarrow UO_2F_2 + 4HF$$
(reaction 1)

$$3UO_2F_2 + 3H_2O \rightarrow U_3O_8 + 6HF + \tfrac{1}{2}O_2$$
(reaction 2)

$$UO_2F_2 + H_2 \rightarrow UO_2 + 2HF$$
(reaction 3)

$$U_3O_8 + 2H_2 \rightarrow 3UO_2 + 2H_2O$$
(reaction 4)

The particles of the intermediate compounds and UO$_2$ which are fluidized by an ascending current of steam and hydrogen in proportions known to those skilled in the art, and this gaseous mixture is heated to temperatures which are generally regulated to between 550° and 650° C.

In this process the conventional reactors in a manufacturing sequence or chain are advantageously replaced by the same number of reactors according to the invention, which provide the following improvements:
better control of the reaction temperatures;
large increase in the material transfer coefficients;
rise in the criticality threshold produced by the shape itself and by the possible interposition of neutron screens in the central zone, outside the fluidized bed.

The last two advantages enable the unit production of a manufacturing line to be substantially increased using the same number of fluidized reactors.

Figure 6:
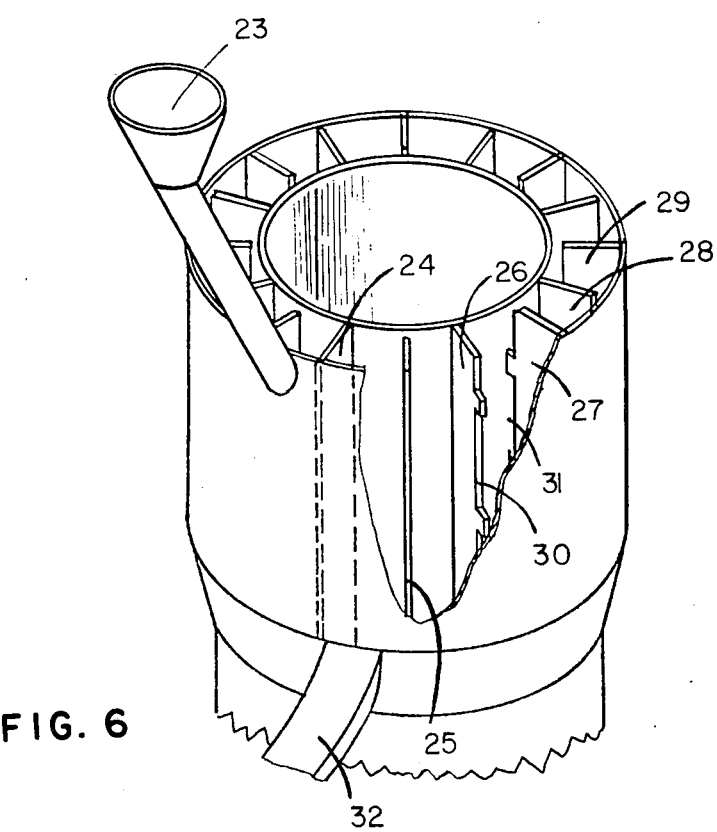
FIG. 6 is a diagrammatic perspective view, with a portion of an outer wall broken away, of a modified form of the annular reactor of FIG. 3.

It is also worth noting that by means of slight adaptations, as shown in FIG. 6, such as baffles or deflectors like those which will be described hereinafter and the establishment of a temperature gradient of 550° to 650° C for example along one part of the circumference of the reactor, a single annular reactor constructed in accordance with the invention ensures the conversion of uranium hexafluoride into ceramic quality uranium oxide. Such an arrangement obviates the necessity of using several reactors in series. Hitherto it has not been possible to avoid this complication, for a single conventional reactor is not able to ensure and regulate the desired thermal gradients, and the presence of fluorine compounds in all parts of the fluidized bed gives rise to serious disadvantages such as coalescence of the bed or the production of uranium oxide of insufficiently high quality. It is quite clear that in this single reactor process the reactor according to the invention preserves the advantages which have been described for the process operating with several successive annular reactors, and the process may easily be carried out in a continuous manner.

An annular fluidized jet reactor according to the invention is also particularly advantageous for carrying out all types of interaction or reaction between a divided batch constituting the fluidized bed and one or more fluids or mixtures of fluids injected through this batch. In particular, several successive reactions may be performed between a divided batch and different process fluids injected in succession. This is the case for example in the production of granular $UAl_3$ alloys in a fluidized bed in accordance with the process described by S. Grimmet in U.S. Pat. No. 3,318,670. In this process a batch consisting of more or less spherical grains of aluminum having a diameter less than 1 mm is treated in four successive steps in a fluidized bed:

1. Injection at 350° C of uranyl nitrate, which decomposes on contact with particles of aluminum to give a deposit of $UO_3$ on the said particles
2. Injection of alcohol or hydrogen at the same temperature in order to reduce $UO_3$ to $UO_2$
3. Simultaneous reduction and chlorination of $UO_2$ by $CCl_4$, which converts the $UO_2$ layer deposited on the aluminum into $UCl_4$
4. Reaction of $UCl_4$ with Al at 680° C in a stream of inert gas such as argon, with the formation of the intermetallic compound $UAl_3$ and liberation of $AlCl_3$.

The use of the reactor according to the invention in order to carry out this particularly complex series of operations is especially advantageous. In fact, this type of reactor has a high mass transfer coefficient and is particularly suitable for producing very accurate operating temperatures. Furthermore, the annular shape may increase the criticality threshold in the case of nuclear fuels, and consequently the permissible unit batch with respect to this threshold. In order to raise this threshold still further, neutron absorber material may be placed in the central zone of the reactor, outside the fluidized bed.

Numerous processes connected with the food, agricultural or pharmaceutical industries may be mentioned. For example, the drying of cereals is generally carried out in a central jet fluidized bed. The diameters of the reactors used are limited by temperature control problems, since the active zone has to be hot enough to produce rapid evaporation, but not so hot that superficial baking of the grains occurs.

An annular reactor according to the invention substantially increases the capacity of the drying unit, while easily satisfying these temperature limitations.

The central jet annular reactor according to the invention may also be adapted, without any special difficulty, to the continuous operation of all types of treatments of divided batches using one or more fluids or mixtures of fluids. These treatments may be of a physical, physico-chemical or chemical nature. In this case it is a question of organizing a systematic circulation of the particles, as seen in FIG. 6, from a charging hopper and orifice 23 to a discharge chute and orifice 32. For this purpose these two orifices may for example be arranged close to one another on the annulus, while placing a separating means such as a vertical and radial partition 24 between them, which closes the annulus from the orifice of the pipe as far as a level sufficiently beyond the level of the fluidized bed in order to prevent any escape. Means for regulating the annular circulation velocity may also be provided employing radial partitions 25, 26, 27, 28, 29, etc., extending substantially over the whole height of the fluidized bed and provided with suitably arranged openings 30, 31, etc., which may possibly be regulated in a continuous or non-continuous manner. These partitions may also be arranged as baffles so as to cause the particles to perform a zigzag path. Finally, this annular reactor may also be provided with movable radial vertical partitions, not shown, in the annular space around the axis of the reactor, which moves continuously in the same direction. Such partitions will continuously drive the bed of fluidized particles from the charging orifice to the discharge orifice and will enable the residence time of the particles in the reactor to be determined to a high degree of accuracy. In particular, one of the two latter arrangements will be advantageously used in the process for converting uranium hexafluoride into uranium dioxide in a single fluidized reactor, as hereinbefore described.

I claim:

1. In a central jet fluidized bed reactor in which systematic circulation of the particles comprising the bed is effected by at least one jet of fluid the combination comprising a reactor vessel having walls defining an upright generally annular upper chamber for containing the particles forming the fluidized bed, and means for centrally introducing a generally annular fluidizing stream upwardly into the annular chamber approximately equidistant from the walls wherein the particles of the bed are carried rapidly upward by the fluidizing stream as a diluted bed in a region whose axis is approximately equidistant from the walls which particles then travel down along the vicinity of the walls as a dense nearly unfluidized stream.

2. A fluidized bed reactor according to claim 1, wherein the cross-section of a portion of the annular chamber includes walls which converge towards the base and the means for centrally introducing a generally annular fluidizing stream comprises, the said walls being joined to the orifice of at least one pipe which consists of at least one element comprising an annular fluidizing stream distribution.

3. A fluidized bed reactor according to claim 2, wherein the fluidizing stream distributor is comprised of a triple pipe consisting of three concentric annular orifices, the external and internal orifices being used to inject the pre-fluidization gas.

4. A reactor according to claim 2 wherein the annular pipe or pipes include substantially vertical radial partitions.

5. A reactor according to claim 4, wherein the partitions of the pipe or pipes is inclined with respect to the vertical.

6. A fluidized bed reactor according to claim 1, including means defining a feed orifice, and means arranged around the annulus in contact with the fluidized bed for regulating the circulation velocity of the particles.

7. In a process of operating a fluidized bed dryer or reactor the improvement comprising the steps of: introducing particles to be treated into a generally annular chamber; and centrally introducing at least a generally annular stream of fluidizing medium generally upwardly through the particles for carrying the particles rapidly upward as a diluted bed in a region whose axis is approximately centrally disposed in the annular chamber causing the particles to then travel down along the outer regions of the annular chamber as a dense nearly unfluidized stream.

8. The process according to claim 7 for producing coated particles.

9. The process according to claim 8 in which the particles to be coated are particles of nuclear fuel.

10. The process according to claim 7 for the conversion of uranium hexafluoride into uranium dioxide in a fluidized bed reactor.

11. The process according to claim 9 including providing neutron absorber material in a region inwardly of the generally annular chamber.

12. The process according to claim 7 for drying cereals.

* * * * *